United States Patent Office 3,082,197
Patented Mar. 19, 1963

3,082,197
POLYMERIZATION OF CONJUGATED DIOLEFINS IN THE PRESENCE OF TRANSITION METAL BOROHYDRIDES
Donald R. Witt, Bartlesville, Okla., assignor to Phillips Petroleum Company, a corporation of Delaware
No Drawing. Filed Dec. 1, 1958, Ser. No. 777,226
5 Claims. (Cl. 260—94.3)

This invention relates to polymerization of olefins. In another aspect, this invention relates to a novel polymerization catalyst.

The polymerization of olefins including diolefins by means of various catalyst systems is well known in the art. One such catalyst system is by use of co-catalyst comprising a transition metal halide and certain reducing agents. Thus, for example, Belgian Patent 538,782 (Montecatini and Ziegler) teaches broadly that co-catalyst systems comprising a titanium tetrahalide and an alkali metal borohydride will polymerize ethylene, propylene, and other 1-olefins. Such a catalyst system suffers from the disadvantage that the polymer contains halogen from the transition metal halide. Whether the halogen is chemically combined in the polymer or whether it is present as catalyst residue is not definitely known. In any event, the presence of the halogen is undesirable, since HCl is liberated during molding of the polymer, and this results in corrosion of the molds.

It is an object of this invention to provide a new, improved polymerization catalyst.

It is another object of this invention to provide a polymerization catalyst substantially free of halogens.

Still another object of this invention is to provide a process for the polymerization of unsaturated hydrocarbons in which unsaturation is present in the aliphatic portion of the molecule.

Still another object of this invention is to provide solid polymer of such hydrocarbons which are substantially free of halogen.

Other objects, features and advantages will be obvious to those skilled in the art having been given this disclosure.

The above objects are accomplished according to this invention by utilizing a transition metal borohydride or hydrocarbon derivative thereof as polymerization catalyst for polymerization of olefins.

The catalyst of this invention are the transition metal borohydrides and the analogs of these compounds in which one or more of the hydrogen atoms is replaced by a hydrocarbon radical. These catalysts can be represented by the formula $M(BR_4)_x$, where M is a transition metal, each R is H, or a hydrocarbon radical, e.g. all R's need not represent the same radical, and $x$ is an integer equal to the valence of M. The hydrocarbon radicals can be aryl, substituted aryl, alkaryl, aralkyl, cycloalkyl, substituted cycloakyl, alkyl and substituted alkyl. Preferably all hydrocarbon radicals will be alkyl radicals, and more preferably will not contain more than 6 carbon atoms per radical. As is well known, certain transition metals can exhibit a valence of four or more. When this is the case, it is preferred that the transition metal be present in the catalyst in a valence state one below its maximum.

By the term "transition metals" it is meant the elements of the B subgroups of groups I through VI of the periodic table (Deming), including the metals of the rare earth and actinide families, and all the metals of group VIII. The preferred transition metals are those of sub-groups IVb, Vb and VIb. Examples of such metals include copper, cadmium, scandium, titanium, vanadium, chromium, manganese, nickel, cerium, thorium, hafnium, zirconium etc.

Examples of suitable catalysts include $Ti(BH_4)_3$, $Zr(BH_4)_3$, $V(BH_4)_3$ $Nb(BH_4)_4$, $Cd(BH_4)_2$, $Zn(BH_4)_2$ $Cd[B(C_2H_5)_4]_2$, $Cr[B(Ti-C_4H_9)_2(C_6H_5)_2]_3$ $Ti[B(C_3H_7)_2H_2]_3$, $Ti[B(C_6H_{11})_2H_2]_3$, $Zr(BH_4)_4$ $V(BH)_4$, $Hf(BH_4)_4$, etc.

The catalyst of this invention can be prepared by any method desired and known to the art. One convenient method of preparing the catalyst is by reacting a transition metal compound, preferably a halide and more preferably a chloride or bromide, with a borohydride of an alkali metal or alkaline earth metal or with substituted borohydrides of such metals where the borohydride contains one or more hydrocarbon radicals atached to the boron atom. The transition metal borohydrides can also be prepared by reacting a transition metal halide, hydride, or "fluo salt" (e.g. $NaTiF_5$) with diborane. The method of purification of the transition metal borohydride or substituted borohydride will depend on the specific transition metal used. In some cases, solvent extraction or fractional crystallization can be used. In other cases, the product can be purified by vacuum distillation. One problem arising in the purification of these compounds is caused by incomplete replacement of the Cl (or other atom or group) of the transition metal compound from which the catalyst is prepared. For example, in the preparation of $Ti(BH_4)_3$ by reacting $TiCl_4$ with $LiBH_4$, some $Ti(BH_4)Cl_2$ and $Ti(BH_4)_2Cl$ are formed along with the desired product. These chloro derivatives can be removed by reacting the reaction product with more $LiBH_4$, thereby converting the chloro derivatives to $Ti(BH_4)_3$. The formation of these chloro derivatives can be prevented by using a considerable excess of $LiBH_4$ in the reaction. Similar techniques can be used in the preparation of other transition metal borohydrides or substituted borohydrides.

Another method of preparing the catalyst of this invention comprises reacting a compound of the type $M(OR)_n$ and diborane wherein R is a hydrocarbon radical, generally an alkyl. For example if $Ti(OR)_4$ is reacted with diborane one obtains $Ti(BH_4)_3$. This method is described in the Journal of Electro Chemical Society, volume 104, No. 1, page 26, 1957.

This invention is applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more other compounds containing an active $CH_2=C<$ group which are copolymerizable therewith. Examples of compounds containing an active $CH_2=C<$ group include ethylene, propylene, 1-butene, 1-hexene, 1-octene, 1,5-hexadiene, 1,4-pentadiene, 1,4,7-octatriene, styrene, acrylonitrile, methyl acrylate, methyl methacrylate, vinyl chloride, 2-methyl-5-vinylpyridine, 2-vinylpyridine, and the like. Acetylenic compounds are also polymerized in accordance with this invention. The acetylenic compounds include acetylene itself and various alkyl and aryl substituted acetylenes, containing generally not more than ten carbon atoms per molecule. A preferred group of acetylenic compounds is one having the triple bond between an end carbon atom and a carbon atom adjacent thereto; and a particularly preferred group are acetylenic compounds having not more than four carbon atoms. Examples of acetylenic compounds within the scope of this invention are methyl-acetylene, dimethylacetylene, ethylacetylene, propylacetylene, methylethylacetylene, phenylacetylene, tolylacetylene, vinylacetylene, diacetylene, the hexadienes (e.g. dipropargyl), heptyne-1, butylacetylenes such as tert-butylacetylene and the like.

The above enumeration of polymerizations promoted by the catalyst of this invention is not intended to be exhaustive but rather illustrates the wide variety of monomers which are polymerized or copolymerized by the method of this invention.

The polymerization according to this invention is best carried out in liquid phase, preferably in the presence of an inert diluent and particularly hydrocarbon such as cyclohexane and isooctane. The process can be batchwise or it can be continuous. Frequently, the catalyst is soluble in the diluent, in which case it is often convenient to first dissolve the catalyst in the diluent and pass the resulting solution to the reaction zone where the monomer can be separately introduced or it can be predissolved in a separate portion of diluent. The polymerization can be carried out at a temperature ranging from 0° F. or lower up to 450° F. A temperature in the range 150 to 300° F. is generally employed and a temperature in the range 250 to 300° F. is preferred. The pressure is not critical so long as it is sufficient to maintain liquid-phase conditions. With monomers which would normally be gaseous at reaction temperature, a monomer partial pressure of 100 to 500 p.s.i. is preferred since an increase in monomer partial pressure increases the reaction rate.

An advantage of this catalyst is that polymer containing little or no halogen can be produced without the necessity of purifying the polymer. For example, the calculated chlorine content of a polymer formed with a $Ti(BH_4)_3$ catalyst is 0.00015 ft. percent, while that of a polymer formed with a ($TiCl_4$ and $TiBH_4$) catalyst is 0.31 percent. As mentioned above, low chlorine content is important with respect to mold corrosion.

My invention will be further described with reference to the following examples. These examples show the operability of the invention and advantages thereof and should not be considered limiting in any manner except as taught by the complete specification.

*Example I*

Titanium triborohydride was prepared in an apparatus which consisted of a reaction tube and two U-tube traps, these elements being connected in series. The last trap in the train was connected to a vacuum tube. The reaction tube was mounted vertically, and the connection to the first trap was by means of a tube sealed in the side of the tube near the top. A side arm (for charging $TiCl_4$) was sealed in the side of the reaction tube near the bottom, and a fritted-glass disc was sealed in the cross-section of the reaction tube at a point roughly midway between the top and the bottom. $TiCl_4$ was charged to the bottom of the tube, and $LiBH_4$ was placed on the fritted glass disc. Charging of the reactants to the reaction tube was carried out in an atmosphere of dry nitrogen. A vacuum was then applied to the system, and the $TiCl_4$ vaporized into the $LiBh_4$. The $Ti(BH_4)_3$ resulting from the reaction distilled from the reaction tube, and was collected in the first trap, which was maintained at a temperature of −40° F. The other product, diborane, was collected in the second trap, which was cooled with liquid nitrogen. The trap containing the $Ti(BH_4)_3$ was sealed and removed from the apparatus. The material in this trap contained 0.083% chlorine due to the presence of a small amount of the monochloro and/or the dichloro derivative.

0.22 grams of $Ti(BH_4)_3$, prepared as described above, was charged to a 1-liter stirred reactor, which contained cyclohexane. 220.6 grams of butadiene was charged to the reactor, and the mixture was heated, with stirring, for a period of 41 hours. The reaction was probably completed in considerably less than 41 hours. The reaction pressure was allowed to fall from 150 p.s.i. to 75 p.s.i. due to polymerization of the butadiene. The yield of polymer was 163.3 grams, which corresponds to a productivity of 817 g./g. of catalyst. The inherent viscosity of the polymer was 0.78, and the swell index was 26. Infrared analysis of the polymer indicated 17 percent trans-unsaturation, 20 percent cis-unsaturation, 63 percent vinyl unsaturation, and a total unsaturation of 95.6 percent. The polymer contained 2 percent gel.

*Example II*

Thorium tetraborohydride was used to polymerize butadiene in a manner similar to the polymerization of butadiene in Example I. The reactor conditions were as follows:

Temperature _____° F__ 280
Pressure _____p.s.i.g__ [1] 325–260
Catalyst used _____gm__ 0.85

[1] Initial to final.

The yield was 12.8 gms. of rubberlike polymer and 61.4 grams of viscous, almost gel-like polymer.

In the foregoing specification, inherent viscosity is determined as follows: A 0.1000 gram sample of the polymer is dissolved in 50 ml. of tetralin at room temperature. The viscosity of the solution at 130°±0.2° C. is then determined by means of an Ostwald-Fenske viscosimeter (size 50, 0.8–3.0 centistokes).

Swell index is determined as follows: If the gel content is expected to be below 50 percent, the sample of polymer to be tested for gel should weigh from 0.10 to 0.13 grams while if the gel content is expected to be above 50 percent, a sample weighing from 0.13 to 0.18 is used. The sample is placed in a cage of calibrated weight, fabricated from 80-mesh 18-8 stainless steel screen. The cage containing the polymer is then placed in a 4-ounce wide mouth bottle into which 100 milliliters of reagent grade benzene is pipetted. The bottle is then capped tightly with a threaded cap, fitted with a cardboard gasket and protected with a circle of aluminum foil. The bottle is then placed in the dark for at least 24 hours and preferably not more than 48 hours. No shaking or stirring of the contents is permissible during this dissolution period. At the end of this period, the cage is withdrawn from the bottle and placed in a wide mouth 2-ounce bottle. The weight of the gel which is adhering to the cage is calculated and expressed as swelled gel. The cage containing the gel is then dried in a vacuum oven maintained at a temperature between 70 and 80° C. after which the weight of dry gel is determined. The gel is then calculated as the weight percent of the rubbery polymer which is insoluble in benzene. The swelling index is determined as the weight ratio of swelled gel to dry gel.

I claim:

1. A process for the polymerization of monomeric material comprising conjugated dienes containing from 4 to 8 carbon atoms which comprises contacting the diene with a catalyst consisting essentially of a material having the formula $$M(BH_4)_x$$

wherein M is a transition metal selected from the metals of group IVb of Deming's Periodic Table and $x$ is an integer equal to the valence of M, at a temperature in the range 150–300° F., at a pressure in the range 100–500 p.s.i. and in the presence of an inert hydrocarbon diluent.

2. The process of claim 1 wherein said catalyst is titanium triborohydride.

3. The process of claim 1 wherein said catalyst is thorium tetraborohydride.

4. A process for polymerizing butadiene which comprises bringing together, in an inert organic vehicle, butadiene and a catalyst consisting essentially of titanium triborohydride.

5. A process for polymerizing butadiene which comprises bringing together, in an inert organic vehicle, butadiene and a catalyst consisting essentially of thorium tetraborohydride.

References Cited in the file of this patent

UNITED STATES PATENTS

| | | |
|---|---|---|
| 2,717,889 | Feller et al. | Sept. 13, 1955 |
| 2,728,758 | Field et al. | Dec. 27, 1955 |

FOREIGN PATENTS

| | | |
|---|---|---|
| 548,927 | Belgium | July 14, 1956 |
| 549,638 | Belgium | Jan. 18, 1957 |
| 801,401 | Great Britain | Sept. 10, 1958 |

OTHER REFERENCES

Gaylord: "Linear and Stereoregular Addition Polymers," Interscience (New York 1959). Pages 219, 223 (footnotes 99 and 100); 386–87 (Ex. #28); 378–79 (Ex. #1); 350–51 (Ex. #5); 220 (footnote 25). Belgian patents referred to: 546,151 (3–16–56); 548,927 (6–22–56); 549,638 (7–18–56).